United States Patent [19]

Briers et al.

[11] 4,126,350
[45] Nov. 21, 1978

[54] MOTOR VEHICLES

[75] Inventors: Peter A. Briers, Preston; William T. Lowe, Chorley, both of England

[73] Assignee: British Leyland UK Limited, London, England

[21] Appl. No.: 775,057

[22] Filed: Mar. 7, 1977

[30] Foreign Application Priority Data

Mar. 6, 1976 [GB] United Kingdom ............... 9086/76

[51] Int. Cl.² ............................................. B60J 1/02
[52] U.S. Cl. ................................... 296/28 C; 280/163
[58] Field of Search ............ 296/28 A, 28 C, 28 AB, 296/84 R, 84 A, 90, 75; 280/163

[56] References Cited

U.S. PATENT DOCUMENTS 3,378,278  4/1968  Froitzheim ............... 296/28 C
3,667,565  6/1972  Steiner ..................... 296/28 C Primary Examiner—Philip Goodman
Attorney, Agent, or Firm—Brisebois & Kruger

[57] ABSTRACT

A truck cab has a panel which extends across the front of the cab immediately below a windscreen for the cab, there being a gap between the top edge of said panel and the main body of the cab, the top edge being so shaped that it acts as a grab rail or handle by which a person can pull themselves up.

7 Claims, 2 Drawing Figures

U.S. Patent      Nov. 21, 1978      4,126,350
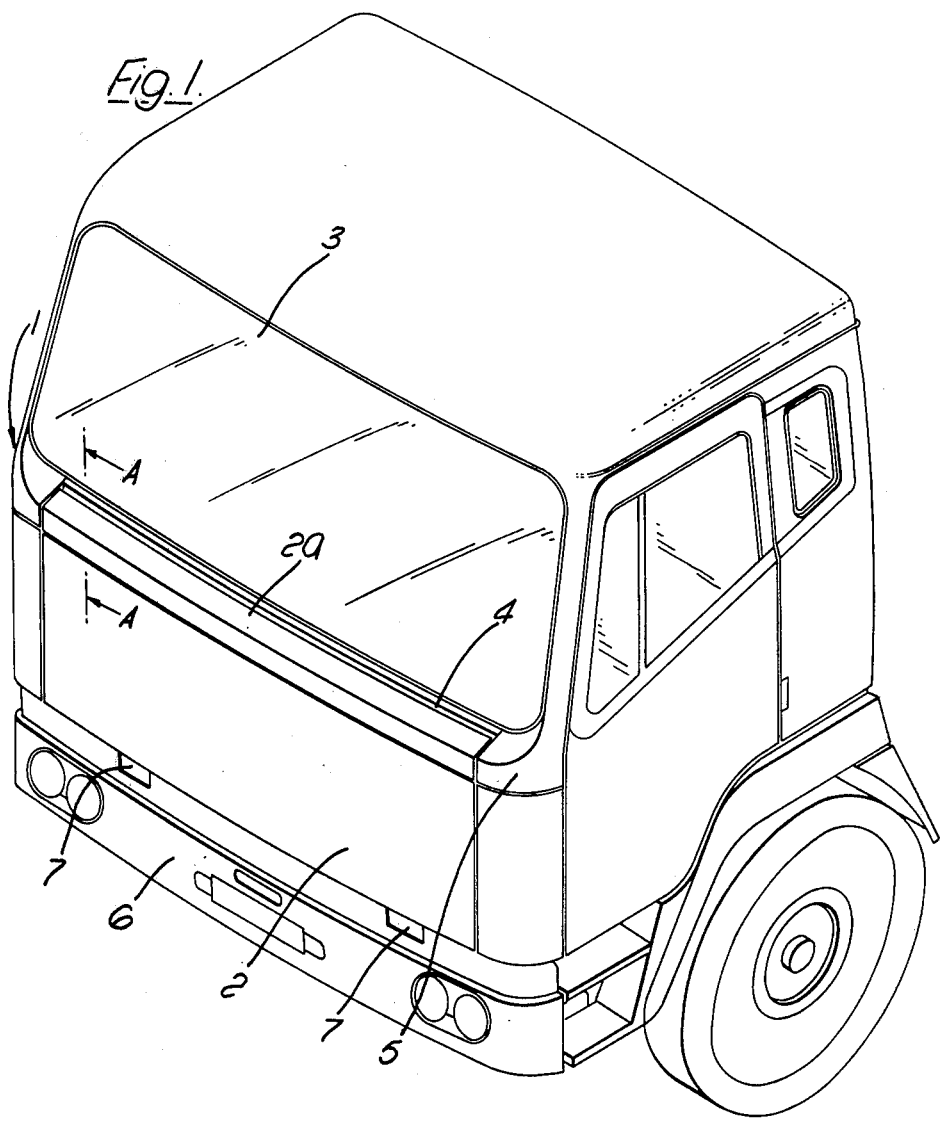
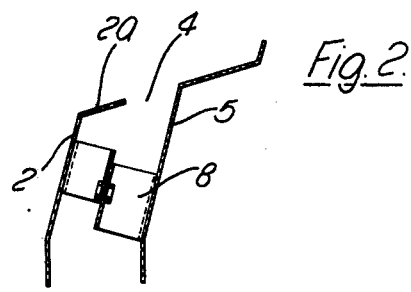

MOTOR VEHICLES

The present invention relates to motor vehicles and more particularly to cabs for trucks.

It is common practice to provide truck cabs of the so-called "forward-control" type with external grab handles on the front of the cab just below the windscreen to enable the driver, or anyone else to pull themselves up to stand on the bumper in order to clean the windscreen for example. The present invention is concerned with the provision of such external grab handles.

According to the present invention a truck cab has a panel which extends across the front of the cab immediately below the bottom of the windscreen, there being a gap between the top edge of said panel and the main body of the cab and the top edge being so shaped that it acts as a grab rail or handle by which a person can pull themselves up.

By this arrangement no separate grab handle or handles as such are necessary and the consequent lack of protrusions from the front of the cab is both a safety feature and more pleasing aesthetically.

How the invention may be carried out will now be described by way of example only with reference to the accompanying drawings of which:

FIG. 1 is a perspective view of a truck cab of the "forward-control" type embodying the present invention; and FIG. 2 is a section taken on the line A—A of FIG. 1.

A truck cab 1 has a number of exterior body panels including a body panel 2 which extends across the front of the cab immediately below the bottom of the cab windscreen 3. The top edge of the panel 2 and the main body 5 of the cab are spaced by brackets 8 to provide a gap 4. The top edge 2a of the panel 2 is so shaped (FIG. 2) that it acts as a grab rail or grab handle by which the driver, or anyone else, can pull themselves up to stand either on the bumper 6 of the cab or in footholds 7 provided for this purpose, in order for example to clean the windscreen.

We claim:

1. A truck cab comprising, a main body, a windscreen mounted in the main body, a body panel having an upper edge extending across the front of the cab immediately below said windscreen, means mounting said body panel on and in spaced relation to the main body of the cab to present a gap between the upper edge of said body panel and said main body, said upper edge of said body panel cooperating with said gap and being shaped to comprise means for providing a grab rail or handle by which a person can pull himself up toward said windscreen.

2. A truck cab as claimed in claim 1 wherein the front of the cab further comprises at least one foothold recessed into the panel at a location substantially below said upper edge of the panel.

3. A truck cab as claimed in claim 1 wherein said means mounting said body panel on and in spaced relation to said main body comprises a bracket secured to an between said body panel and said main body.

4. A truck cab according to claim 1 wherein said body panel forms a continuation of adjacent panels of said main body.

5. A truck cab according to claim 1 wherein said upper edge of said body panel is essentially flush with adjacent panels of said main body, except at said gap.

6. A truck cab according to claim 1 wherein said upper edge of said panel is horizontally spaced from said main body.

7. A truck cab according to claim 1 wherein said upper edge of said panel extends substantially the full width of the windscreen to provide a grab rail extending substantially the width of the windscreen.

* * * * *